United States Patent [19]

Welsh et al.

[11] Patent Number: 4,589,577
[45] Date of Patent: May 20, 1986

[54] DISPENSER CLOSURE

[76] Inventors: William C. Welsh; Peter W. Welsh, both of Lot 400, Range Road, Herne Hill, Western Australia, Australia

[21] Appl. No.: 568,186

[22] PCT Filed: May 9, 1983

[86] PCT No.: PCT/AU83/00057
§ 371 Date: Dec. 19, 1983
§ 102(e) Date: Dec. 19, 1983

[87] PCT Pub. No.: WO83/04082
PCT Pub. Date: Nov. 24, 1983

[30] Foreign Application Priority Data

May 7, 1982 [AU] Australia .............. PF3918
Feb. 1, 1983 [AU] Australia .............. PF7837
Mar. 16, 1983 [AU] Australia .............. PF8469

[51] Int. Cl.⁴ .............................. B67D 3/00
[52] U.S. Cl. .................... 222/518; 222/559; 222/564; 222/566
[58] Field of Search ............ 222/559, 105, 518, 183, 222/511, 512, 513, 514, 510, 498, 499, 107, 131, 566, 567, 569, 564, 517; 251/319, 320, 342, 335 A; 239/461, 590.5

[56] References Cited

U.S. PATENT DOCUMENTS

| | | | |
|---|---|---|---|
| 2,754,097 | 7/1956 | Hjulian | 239/590.5 X |
| 2,832,643 | 4/1958 | Bletcher et al. | 239/461 |
| 3,130,442 | 4/1964 | Kellis | 222/514 X |
| 3,173,579 | 3/1965 | Curie et al. | 222/105 |
| 3,206,075 | 9/1965 | Scholle | 222/105 |
| 3,252,634 | 5/1966 | Scholle | 222/105 X |
| 3,595,445 | 7/1971 | Buford | 222/511 X |
| 3,696,969 | 10/1972 | De Van et al. | 222/183 X |
| 3,972,452 | 8/1976 | Welsh | 222/511 X |
| 4,355,737 | 10/1982 | Pongrass et al. | 222/105 X |
| 4,452,425 | 6/1984 | Lucking | 222/518 X |

FOREIGN PATENT DOCUMENTS 60985 2/1981 Australia .

Primary Examiner—Joseph J. Rolla
Assistant Examiner—David H. Bollinger
Attorney, Agent, or Firm—Harness, Dickey & Pierce

[57] ABSTRACT

A dispenser closure suitable for use with bag-in-box type packages comprising a spout (11), a valve seat (28), a valve member (22) projecting from one face of a substantially concave diaphragm (25) so that the diaphragm urges the valve member into closing contact with the valve seat and a pull-tab (27) projecting from the other face of the diaphragm to enable the valve member to be withdrawn from the seat. A skirt (14) projects below the valve seat and flow directing vanes (20) may be provided within the skirt. An embodiment suitable for use with aerated beverages including beer is also disclosed together with a filling head to be used in conjunction with the closure.

16 Claims, 13 Drawing Figures

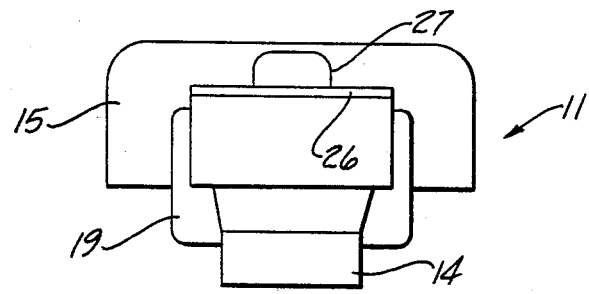
Fig-1
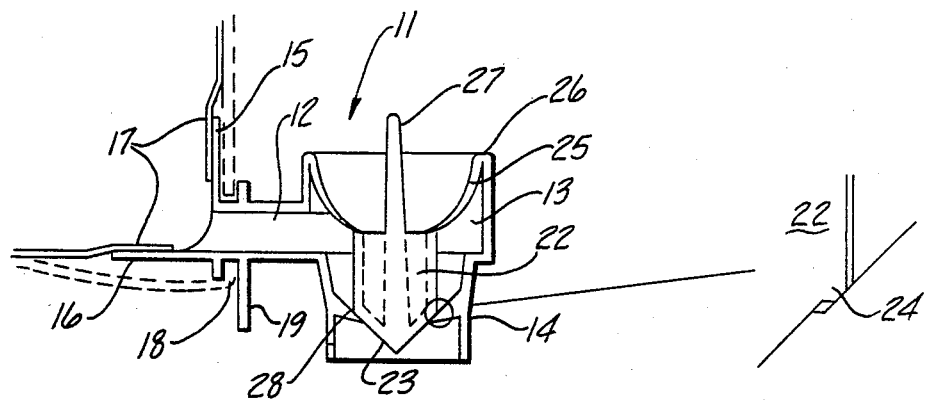
Fig-2
Fig-3
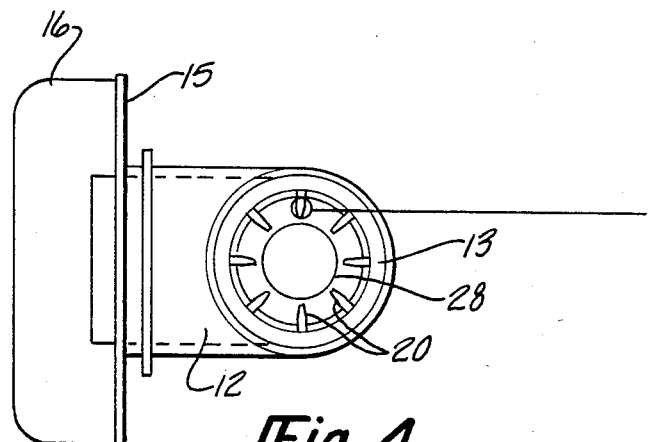
Fig-4
Fig-5

DISPENSER CLOSURE

THIS INVENTION relates to a an improved dispenser closure and apparatus for filling containers fitted with the closure.

The object of the invention is to provide a dispenser closure which is particularly useful for dispensing the contents of a bag-in-box type package which is widely used for packaging of wine and fruit juices and which is simple in construction and operation, self closing and substantially free of external retention or after-drip.

Thus in one form the invention resides in a dispenser closure comprising a spout a valve seat located within the spout a valve member projecting from one face of a substantially concave diaphragm so that the diaphragm urges the valve member into closing contact with the valve seat and a pull tab projecting from the other face of the diaphragm to enable the valve member to be withdrawn from the seat.

Another object of the invention is to provide a closure which is suitable for use with "bag-in-box" type containers filled with carbonated beverages such as aerated waters or beer.

Thus in another form the invention resides in a dispenser closure comprising a spout, a valve seat located within the spout, a substantially concave diaphragm having a tubular extension projecting towards the valve seat, said extension being capable of being rolled back on itself when a force is applied in a direction away from the valve seat, a valve member on one end of a rod connected to and passing through the tubular extension so that the diaphragm and extension urge the valve member into the seating position on the valve seat and a pull tab on the other end of the rod.

The invention will be better understood by reference to the following description of the embodiments shown in the accompanying drawings wherein:

FIG. 1 is a front elevation of a first embodiment;

FIG. 2 is a sectional elevation of the first embodiment;

FIG. 3 is an enlarged view of the circled portion of FIG. 2;

FIG. 4 is plan view of the valve body or spout;

FIG. 5 is an enlarged view of the circled portion of FIG. 4;

Figure 6:
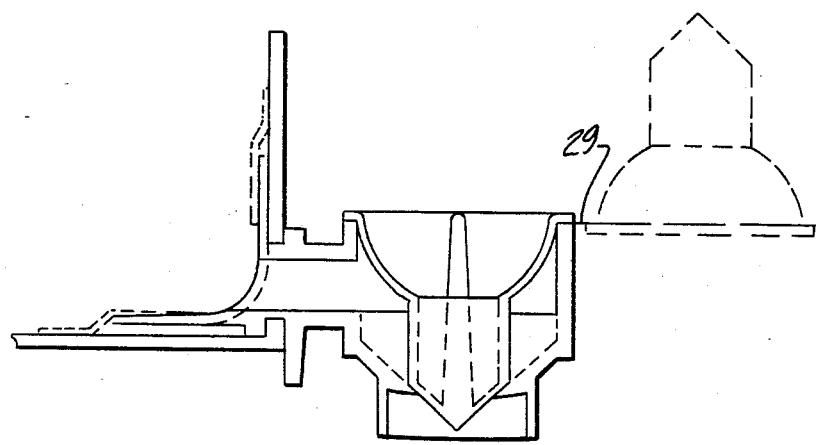
FIG. 6 is a sectional elevation corresponding to FIG. 2 showing how the complete unit can be moulded as a single unit.

The embodiment shown in FIGS. 1 to 5 inclusive the spout 11 is moulded from a suitable plastic material and is provided with a substantially rectangular passage 12 which merges with a circular portion 13 having a downwardly projecting skirt 14. The inner end of the spout is provided with flanges 15 and 16 located at substantially right angles to each other to which the walls 17 of the plastic bag of the bag-in-box type package is secured by welding or other suitable means. The spout is also provided with recesses 18 into which the cardboard component is secured as in the usual manner. By providing the flanges 15 and 16 at right angles to each other it is possible to locate the spout at the bottom of the bag and so ensure substantial emptying of all of the contents of the bag. Also by increasing the length of the downwardly projecting flange 19 it is possible to provide a flange or barrier which can be pushed against the edge of a table or shelf during the operation of the valve. As shown in FIG. 4 of the drawings the downwardly projecting skirt 14 is provided with series of inwardly directed vanes 20 the inner edges of which are chamfered as shown in reference 21 in FIG. 5. These vanes serve to control the turbulence of the liquid flowing through the skirt 14 and also the inner edges act as guides with minimal clearance on the valve member as hereinafter described. The valve member 22 is substantially cylindrical and is provided with a conical end 23 and preferably with the junction between the conical portion and the cylindrical wall of the valve member being provided with a sealing ring 24 as shown in FIG. 3 which acts similarly to an O-ring type seal. The valve member is moulded integral with a hemispherical diaphragm 25 which is provided with a peripheral flange 26 which seats on the upper end of the circular portion 13 of the spout and may be welded or otherwise secured in position. The thickness of the diaphragm increases towards the outer periphery thereof. The face of the diaphragm opposite to the downwardly projecting valve member 22 is provided with a pull tab 27. The valve member 22 seats on a valve seat 28 formed within the skirt 14 being urged into the closed position by the downwardly projecting hemispherical diaphragm 25.

Figure 7:
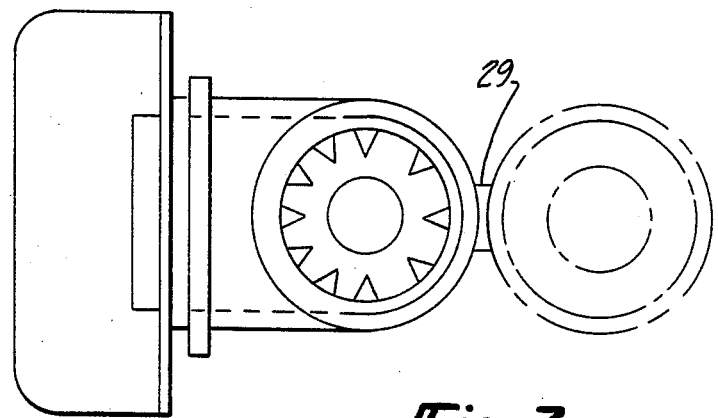
FIG. 7 is a plan view of the embodiment shown in FIG. 6.

It is possible to mould the complete unit as a single unit as is shown in FIGS. 6 and 7 of the drawings. The diaphragm 25 with the valve member 22 and pull tab 27 integral therewith is connected to the upper edge of the circular portion 13 of the spout by a short bridge 29 as is shown in FIGS. 6 and 7 so that the complete unit can be formed as a single moulding. It is a simple matter to rotate the valve assembly to the assembled position by rotating it through 180° as is best seen by reference to FIG. 6.

The dispenser closure of the present invention has several characteristics which represent considerable advantages over the closures at present in use. These characteristics are:

1. ZERO EXTERNAL FLUID DROP RETENTION

Although the closure has an internally located valve, the end of the valve member 22 is formed to a cone 23 which projects out through the valve opening or seat 28, acting both to consolidate the fluid flow characteristics and to drain off externally retained drops of fluid as the valve is closed. The protruding valve end 23 is protected against accidental mechanical opening of the valve by the lower end of the skirt 14 which doubles as a spigot locating guide during the bag filling operation.

2. HEMISPHERICAL DIAPHRAGM (a) The Hemispherical Elastomeric diaphragm 25 is easily deformed by mechanic pressure applied against the point on its surface (via the operator's 'Pull-Tab') 27 allowing the valve member 22 to withdraw and open the valve. The Hemispherical shape is however, much more resistant to deformation due to pressures applied simultaneously over a wide area.

The spigot presents a wide band of the diaphragm's convex surface to the internal pressures of the fluid filled bag. In theory, there is of course a level of internal fluid pressure which will overcome the geometric resistance of the diaphragm and cause it to blow inside-out, however, at all pressures up to this threshold value, the valve seal displays positive valve seal characteristics i.e., increases of internal fluid pressure act via the spherical diaphragm to increase the pressure of the valve against its seat—hence the "Positive Seal" effect.

(b) Self Closing

The valve is self closing due to the elastomeric memory of the diaphragm.

(c) Differential Operating Pressure Feature

The Pull-Tab 27 allows point pressure to be applied to easily deform the diaphragm and open the valve. In addition, a differential operating pressure characteristic has been achieved by varying the thickness of the diaphragm wall, the thickness increasing from the area through which the pull-tab acts, toward the upper edge of the diaphragm. As the pull-tab is operated, deformation of the diaphragm is confined to the area adjoining the pull-tab, at the thin area of the tapered diaphragm wall, offering minimal opposition to the operator. As the pull-tab is lifted further, the deformation spreads into the upper walls which are thicker and offer more opposition. The pull-tab operation is thus differentially sensitive in relation to the degree of valve-opening to enable the rate of flow to be varied as required.

(d) Parking the Valve in the Open Position

The construction of the valve allows the valve member 22 to be fixed in a 'hands off' fully open position. When the pull-tab 27 is withdrawn toward the upper limit of its operating distance, the valve member fixed to the other side of the diaphragm can be lain across the valve guide vanes 20 to 'lock-up' the valve action and resist reformation of the diaphragm. The valve is thus 'parked' in the open position, where it will stay until mechanically reset.

3. CONCENTRATION AND DIRECTION OF FLUID FLOW

Three unique design features have been incorporated which have vastly improved the fluid flow characteristics of the closure in comparison to designs currently available. The combined result of these features is a clean vertical stream whose direction is fixed and predictable; it resembles a glass rod through the full flow range. The design features which have enabled these advances are:

(a) Turbulence Control Vanes

Eight vertical vanes 20 with chamfered edges are spaced evenly around the valve chamber to prevent the liquid from swirling and exiting the chamber in a flaring, broken flow. The vanes straighten the flowing liquid and distribute it evenly and in controlled volume across the valve seat from all directions, thus presenting the liquid to the flow concentrator in a prestabilised mass.

(b) Valve Core Guides

In order to maintain symmetrical flow to the flow concentrator it is essential to stabilise the rising valve core during operation. This is done by using the inner edges 21 of the eight turbulence control vanes as guides with minimal clearance. The vanes therefore fulfill a dual function.

(c) Flow Concentrator

The conical tip 23 of the valve core, projecting downward through the valve opening, acts to concentrate the pre-stabilised fluid mass into a smooth stream (resembling a vertical glass rod) as it leaves the valve opening.

4. 90 DEGREE BAG MOUNTING FLANGE

A serious disadvantage with the bag-in-box packaging has been the difficulty in obtaining the last 12% (approx.) of content due to circular bag mounting flanges which raises the lowest exit level to 25 mm. in most cases. Unless the user tilted the cask or removed the spigot this 12% of content was thrown out with the cask when normal flow stopped. By providing a rectangular bag flanges 15 and 16 which are located at 90 degrees to each other so that the spigot lies snugly on the bottom of the box, and the drainage level is lowered to 2 mm.

5. TABLE OR SHELF LOCATION FLANGE

As a bonus feature the lower box location flange 19 on the spigot trunk extends downward to project below the bottom of the cask so as to prevent it sliding back across the shelf. The box is thus fixed at the optimum position for the pouring operation. The flange is sturdy enough to support the full cask if stood back on the shelf.

6. RECTANGULAR SPIGOT TRUNK

Round spigot trunks in general have a disadvantage in the lack of positive orientation of the pouring spout to the box. In many cases, round spigot trunks allow the spigot to rotate in the spigot opening, resisting all efforts to twist them to an upright position. This misalignment may occur at either of two stages in the production operation: disorientated placement of the spigot on the bag, or misaligned bag placement in the box at the filling station. The closure of the present invention eliminates this problem by having a rectangular trunk section. Box locating flanges on the trunk are rectangular and the box slot 18 (also rectangular) locates the spigot accurately in relation to the box. The cask tapping operation is made more effective through this positive locking feature.

7. SPOUT COLLAR/FILLING-GUIDE RING

The lower end of the skirt 14 functions to:

(a) Protect the protruding end 23 of the valve member against accidental mechanical pressures which might open the valve (b) to act as a guide support for the receptable being filled (c) to act as a guide ring for accurate filling and location during through-valve filling operations.

8. THROUGH-VALVE FILLING CAPABILITY

Contemporary bag-in-box filling operations employ a system in which the spigot and bag, fitted together at the point of manufacture, are shipped to the filling location, where the spigot must be removed from the bag for the filling operation, and refitted upon completion. These procedures contribute to:

(a) a greater risk of contamination of both the bag and the spigot (b) of misalignment of the spigot in relation to the bag upon replacement after filling, with great loss of consumer appeal (c) a greater complexity of filling machine mechanicals (d) a requirement for high skill level filling head operators (e) a labor-intensive filling operation.

The closure of the present invention is designed for through valve filling to obviate the problems attendant upon removal of the spigot during the filling operation. Either mechanical pressure or the pressure of the filling fluid operates against the conical valve member to open the valve. When the filling flow ceases, the self-closing action of the valve comes into play.

9. SINGLE PIECE MOULDING CAPABILITY

The closure of the present invention is unique in that it is capable of being moulded as one piece as has been explained with reference to FIGS. 6 and 7.

Figure 8:
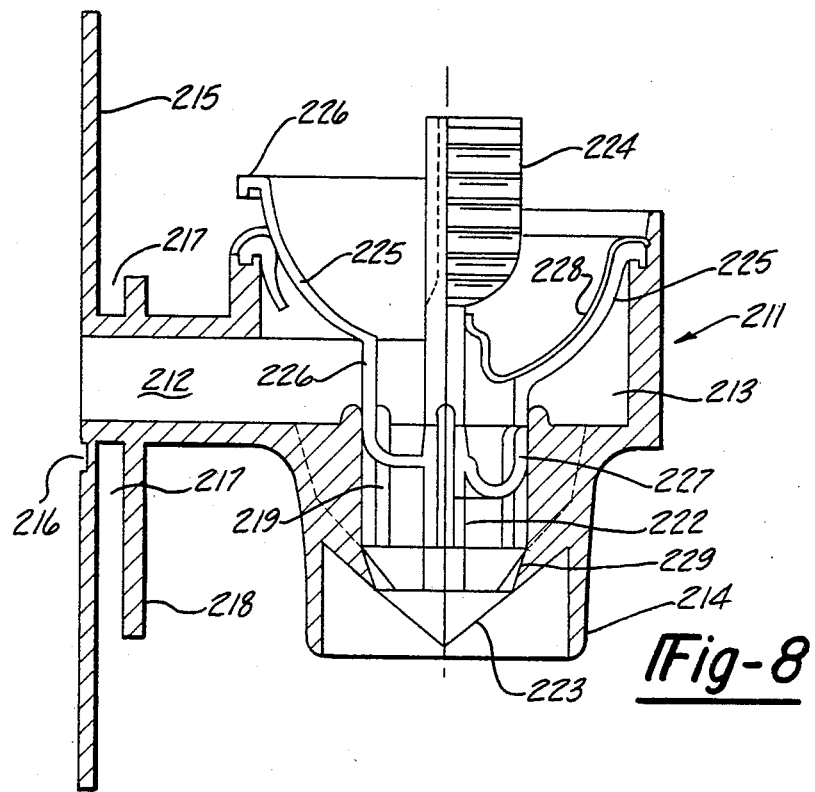
FIG. 8 is a sectional elevation showing a further embodiment of the tap in the closed position.
Figure 9:
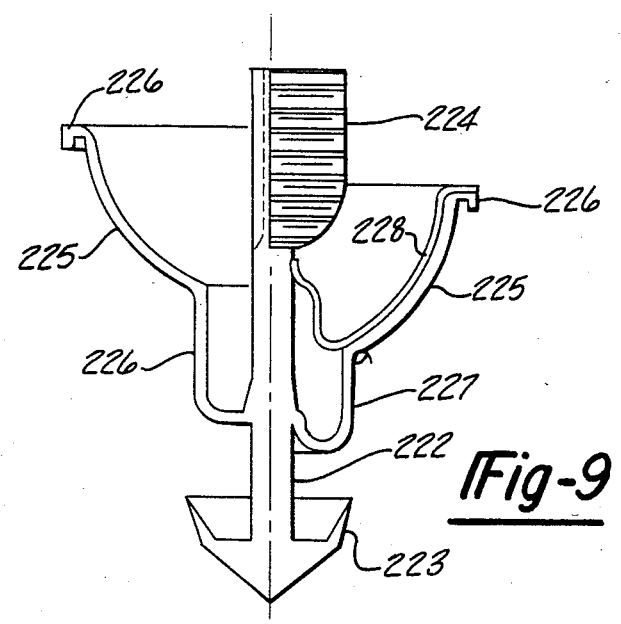
FIG. 9 is a sectional elevation of the valve member of FIG. 8 and its associated components.

In the embodiment shown in FIGS. 8 and 9 of the drawings the spout 211 is moulded from a suitable plastic material and is constructed in a similar manner to the spout described above and shown in FIGS. 1 to 5 of the drawings in that it is provided with a substantially rectangular passage 212 which merges with a circular portion 213 having a downwardly projecting skirt 214. The inner end of the spout is provided with a circular flange 215 to which the walls (not shown) of the plastic bag of the bag-in-box type package is secured by welding or other suitable means. As is described above in relation to the first embodiment a transverse hinge 216 is formed in the flange 215 just below the lowermost portion of the passage 212. The spout is provided with recesses 217 into which the cardboard component of the package is fitted in the usual way. The hinge 216 permits the bottom portion of the flange 215 to be folded at right angles thus enabling the spout to be located at the bottom of the bag. By increasing the length of the downwardly projecting flange 218 it is possible to provide a flange or barrier which can be pushed against the edge of a table or shelf during operation of the valve.

The downwardly projecting skirt 214 is provided with series of inwardly directed vanes 219 the inner edges of which are chamfered. These vanes serve to control the turbulence of the liquid flowing through the skirt 214 and also the inner edges act as guides with minimal clearance on the valve member as hereinafter described.

The valve member assembly comprises a rod 222 having a valve member 223 which is of a substantially arrow head cross-section, formed on its lower end and having a pull-tab 224 on its uppr end. Intermediate its ends the rod is provided with an integrally moulded hemispherical diaphragm 225 which is provided with a peripheral flange 226 which seats on the upper end of the circular portion 213 of the spout and may be welded or otherwise secured in position. The pole portion of the diaphragm merges with a tubular extension 226 which is welded or moulded integral with the rod 222. The tubular extension is formed so that it can be rolled back on itself and in the assembled position is partially rolled back on itself as indicated by reference 227 in FIG. 9. The tubular extension is so dimensioned that it sits neatly within the vanes 219. The diaphragm 225 is reinforced by a similarly shaped metal member 228 the outer periphery of which overlies the flange 226 and the inner portion of which is shaped to provide a bearing for the rod 222. The valve member 223 seats on a valve seat 229 formed within the skirt 214. The valve member is urged into the seating position by the action of the diaphragm 225 and the tubular extension 227. The reinforcing member 228 prevents the diaphragm distorting under the action of the pressure generated by the contents of the container. The pressure acting on the upper portion of the tubular extension acts equally around the upper portion.

An upward pulling action on the pull tab 224 lifts the valve member 223 off the seat 229 and the tubular extension rolls back on itself allowing liquid to pass through the skirt 214.

Figure 10:
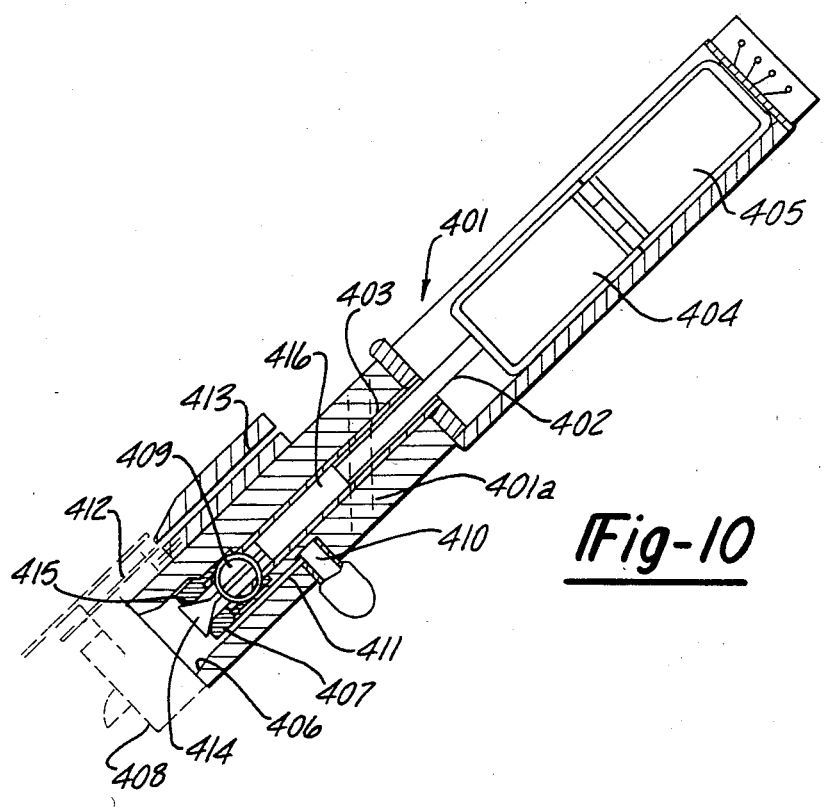
FIG. 10 is a sectional elevation of a filling head suitable for filling containers fitted with closures constructed in accordance with the invention.

A filling head suitable for filling containers fitted with the closure of the present invention is shown in FIG. 10 of the drawings. The head comprises a body 401 having a pair of slots 401a on either side to enable the body to be mounted in an inclined position. An operating rod 402 is slidably mounted in a longitudinal tubular passage 403 in the body. The operation of a rod is controlled by a pair of solenoids 404 and 405. The lower end of the body is provided with a mouth 406 adapted to receive the skirt 407 of the dispenser closure 408 shown in broken lines in FIG. 10. The passage 403 connects to the mount and is provided with a delivery inlet 409. The lower end of the rod is provided with an inverted conical member 414 which in the closed position seats on a seat 415 at the end of the tubular passage. A piston 416 on the rod seals the upper portion of the tubular passage. A suction line connection 410 is connected to the mouth through a small passage 411.

When the container (not shown) fitted with the closure is presented to the mouth the flange 412 of the closure bears against the lower end of a rod 413 slidably mounted on the side of the body. The upper end of the rod 413 bears against a micro switch (not shown) so that the switch is activated.

The operation of the micro switch activates a valve in the suction line so that the closure is drawn onto and held to the mouth of the filling head. At the same time one of the solenoids operates to push the rod 402 downwardly to displace the valve 414 off its seat. The conical member 414 mates with the conical end of the closure valve member and acts as a buffer to prevent the force of the incoming liquid pushing the closure valve member to invert the diaphragm. The piston 416 prevents the liquid flowing into the upper portion of the tubular passage. Liquid can then flow through the inlet 409 and the lower end of the passage 403 through the open valve into the container. When the container has been filled a sensing device is actuated and the valve in the suction line closure and the other solenoid operates to withdraw the rod and the valve closes. The filled container drops away from the filling head and may be replaced by a fresh container to be filled.

The filling head is so constructed that substantially no air comes into contact with the liquid during the filling operation and air cannot enter either filling head or the container during the filling operation thus eliminating the need for purging the container with nitrigen or other inert gas.

As discussesd above in connection with the first embodiment a serious disadvantage with most of the bag-in-box packaging has been the difficulty in dispensing the last 12% (approximately) of the contents of the bag due to the circular bag mounting flange which raises the exit level to 25 mm above the bottom in most cases. Unless the user tilts the package or removes the spigot from the spout this 12% of the contents is thrown out with the cask when normal flow ceases. It has been found that by providing a transverse hinge in the mounting flange below the level of the exit spout it is possible to provide a closure in which almost the entire contents of the bag can be dispensed in the normal manner.

Thus in another form the invention resides in a dispenser closure of the bag-in-box type having a bag mounting flange adapted to be welded to the bag characterised in that said flange is provided with a transverse hinge located below the level of the exit spout so that the lower portion of the flange can be folded to an angle of approximately 90% to the upper part of the flange.

The dispensing valve fitted to the closure may be of any desired design.

This aspect of the invention will now be described with reference to the specific embodiment shown in FIGS. 11, 12 and 13 of the drawings.

Figure 13:
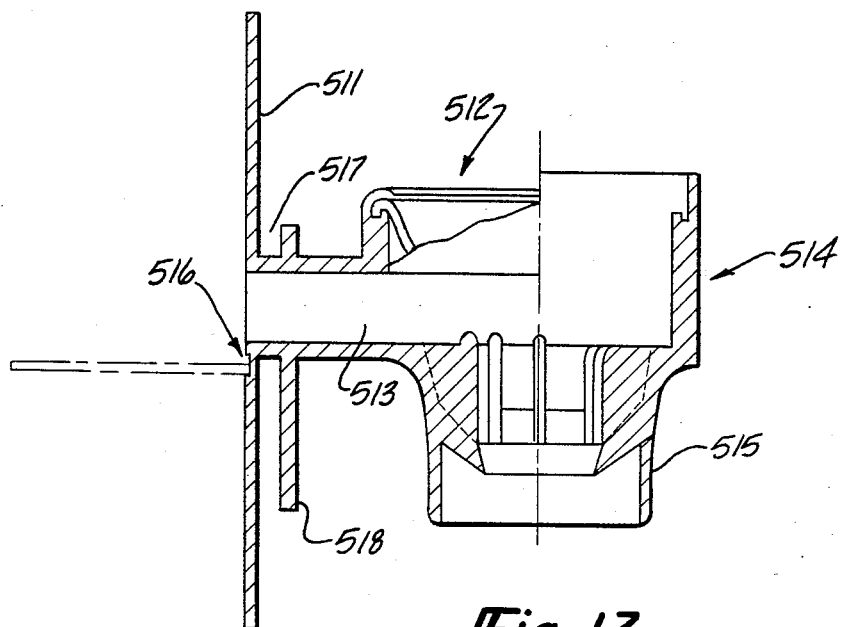
FIG. 13 is a vertical cross section of the embodiment of FIG. 12.
Figure 11:
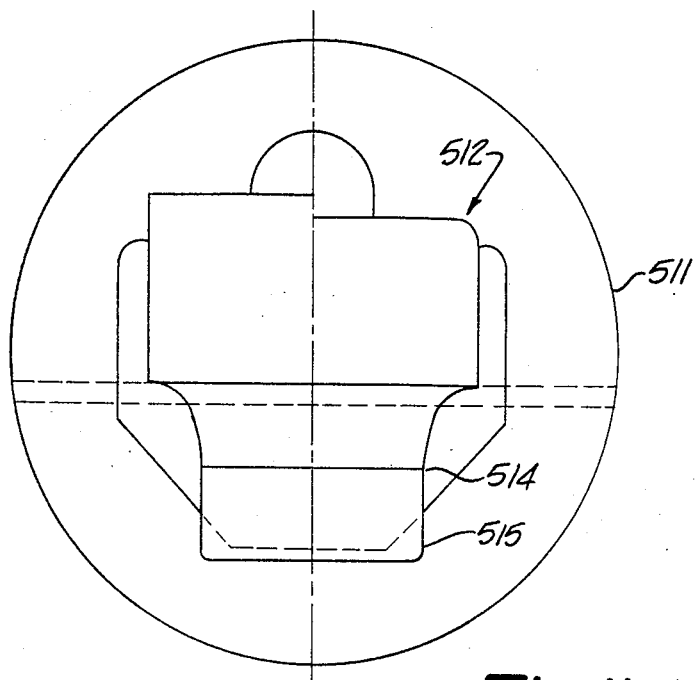
FIG. 11 is an elevation of a further development applicable to most bag-in-box type dispenser closures.
Figure 12:
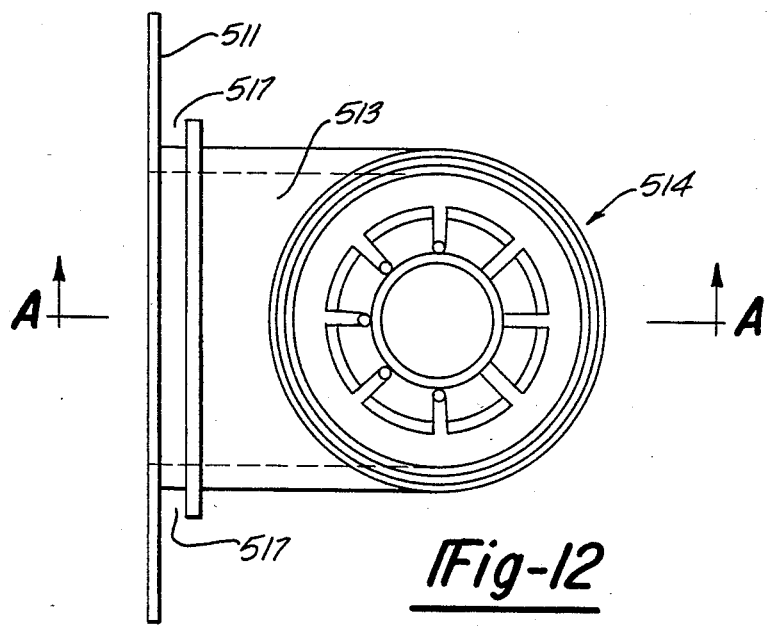
FIG. 12 is a plan view of the embodiment of FIG. 11.

As shown in FIGS. 11, 12 and 13 of the drawings the closure if provided with a circular bag mounting flange 511 from which a spout 512 projects. The body is provided with a passage 513 which merges with a circular valve housing portion 514 having a downwardly projecting skirt 515. The valve is constructed substantially as is described above with reference to FIGS. 1 to 5 of the drawings. In accordance with the invention a transverse hinge 516 is formed in the flange 511 just below the lowermost portion of the passage 513. The spout is provided with recesses 517 into which the cardboard component of the package is fitted in the usual way. The hinge 516 permits the bottom portion of the flange to be folded to the position shown in broken lines in FIG. 13 of the drawings thus enabling the spout to be located at the bottom of the bag. By increasing the length of the downwardly projecting flange 518 it is possible to provide a flange or barrier which can be pushed against the edge of a table or shelf during operation of the valve.

Whilst the invention has been described with particular reference to the use of a particular type of valve it will be understood that the hinged bag mounted flange may be used with any other type of dispensing valve.

THE CLAIMS defining the invention are as follows

We claim:

1. A dispenser closure comprising a spout having an outlet defined by a valve seat located within the spout, a flexible diaphragm defining a wall of the spout in opposed relation to the internal face of the valve seat and concave on the side of the spout facing away from said valve seat and convex on the side of said diaphragm facing toward said valve seat, a valve member affixed to and projecting from the inner convex face of the diaphragm into engagement with the valve seat whereby the diaphragm urges the valve member into closing engagement with the valve seat, the outer end of the valve member engaging the valve seat having a convergent configuration, a tab projecting from the outer concave face of said diaphragm for facilitating manual deformation of the diaphragm to lift said valve member from said valve seat and a set of inwardly directed vanes formed in said outlet surrounding the valve seat adjacent the internal face thereof for precluding turbulence in the flow through said valve seat.

2. A dispenser closure as claimed in claim 1 wherein the closure is provided with a flange for fixing the closure to a container characterised in that said flange with a substantially right angle return to enable the closure to be fitted to the bottom of the container.

3. A dispenser closure as claimed in claim 1 wherein the closure is defined with a downwardly projecting flange which can be pushed against the edge of a table or shelf during the operation thereof.

4. A dispenser closure as claimed at claim 3 wherein the closure is provided with a downwardly projecting skirt surrounding the outlet below the valve seat.

5. A dispenser closure as claimed at claim 4 wherein the skirt extends beyond the valve seat a greater distance than the outer end of the valve member.

6. A dispenser closure as claimed at claim 5 wherein a reinforcing member is mounted across the exterior face of the diaphragm to surround said tab to limit the degree of deformation of the diaphragm and control the movement of said tab.

7. A dispenser closure as claimed at claim 5 having a bag mounted flange in the closure adapted to be fixed to a container wherein said flange is provided with a transverse hinge located below the level of the spout in order that the lower portion of the flange can be approximately perpendicular to the upper part of the flange.

8. A dispenser closure as claimed at claim 4 wherein said valve member comprises a rod like extension having a substantially conical valve mounted to its outer end.

9. A dispenser closure as claimed at claim 8 wherein the periphery of the conical valve is formed as a flange.

10. A dispenser closure as claimed in claim 1 wherein the closure is provided with a downwardly projecting skirt surrounding the outlet below the valve seat.

11. A dispenser closure as claimed at claim 1 wherein at least a portion of the outer end of the valve member extends beyond the valve seat when in closing engagement therewith.

12. A dispenser closure as claimed at claim 1 wherein the vanes extend axially away from said valve seat and said valve member is slidably accommodated within their inner edges.

13. A dispenser closure as claimed at claim 1 wherein said diaphragm is partially spherical and said valve member is located centrally thereon.

14. A dispener closure as claimed at claim 1 wherein said valve member is connected to said diaphragm through a tubular extension projecting from the diaphragm towards said valve seat wherein said extension is capable of being rolled back on itself when a force is applied to said tab in a direction away from the valve seat.

15. A dispenser closure as claimed at claim 1 wherein a reinforcing member is mounted across the exterior face of the diaphragm to surround said tab to limit the degree of deformation of the diaphragm and control the movement of said tab.

16. A dispenser closure as claimed at claim 1 having a bag mounted flange in the closure adapted to be fixed to a container wherein said flange is provided with a transverse hinge located below the level of the spout in order that the lower portion of the flange can be approximately perpendicular to the upper part of a flange.

* * * * *